(12) United States Patent
Dodge et al.

(10) Patent No.: US 10,160,891 B2
(45) Date of Patent: Dec. 25, 2018

(54) HIGH PERFORMANCE WATER-BASED TACKIFIED ACRYLIC PRESSURE SENSITIVE ADHESIVES

(71) Applicant: Honeywell International Inc., Morristown, NJ (US)

(72) Inventors: Robert G. Dodge, Bristol (GB); Kurt Severyns, Borsbeek (BE)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 13/750,844

(22) Filed: Jan. 25, 2013

(65) Prior Publication Data
US 2013/0202885 A1    Aug. 8, 2013

Related U.S. Application Data

(60) Provisional application No. 61/596,622, filed on Feb. 8, 2012.

(51) Int. Cl.
| | |
|---|---|
| *C09J 7/38* | (2018.01) |
| *C09J 7/20* | (2018.01) |
| *C09J 133/08* | (2006.01) |
| *C09J 133/12* | (2006.01) |
| *C09J 123/08* | (2006.01) |
| *C09J 123/30* | (2006.01) |
| *C08K 5/01* | (2006.01) |
| *C08L 33/08* | (2006.01) |
| *C08L 33/12* | (2006.01) |
| *C08L 23/30* | (2006.01) |
| *C08L 51/06* | (2006.01) |
| *C09J 4/06* | (2006.01) |
| *C08L 23/08* | (2006.01) |

(52) U.S. Cl.
CPC ............. *C09J 133/08* (2013.01); *C08K 5/01* (2013.01); *C08L 23/0869* (2013.01); *C08L 23/30* (2013.01); *C08L 33/08* (2013.01); *C08L 33/12* (2013.01); *C08L 51/06* (2013.01); *C09J 4/06* (2013.01); *C09J 7/385* (2018.01); *C09J 123/0869* (2013.01); *C09J 123/30* (2013.01); *C09J 133/12* (2013.01); *C09J 2205/102* (2013.01); *C09J 2205/114* (2013.01); *C09J 2423/04* (2013.01); *C09J 2431/00* (2013.01); *C09J 2433/00* (2013.01); *Y10T 428/2891* (2015.01)

(58) Field of Classification Search
None
See application file for complete search history.

(56) References Cited

U.S. PATENT DOCUMENTS

| | | | |
|---|---|---|---|
| 4,043,959 A | 8/1977 | Frye | |
| 4,110,290 A | 8/1978 | Mori et al. | |
| 4,853,427 A * | 8/1989 | Herten et al. | 524/394 |
| 5,281,473 A | 1/1994 | Ishiwata et al. | |
| 5,284,891 A * | 2/1994 | Wouters et al. | 524/522 |
| 5,318,835 A | 6/1994 | Sawamoto et al. | |
| 5,706,133 A | 1/1998 | Orensteen et al. | |
| 6,037,054 A * | 3/2000 | Shirai et al. | 428/356 |
| 6,235,822 B1 | 5/2001 | Whetten et al. | |
| 6,368,707 B1 * | 4/2002 | Kamiya et al. | 428/349 |
| 6,552,118 B2 * | 4/2003 | Fujita et al. | 524/588 |
| 6,805,954 B2 | 10/2004 | Silverberg et al. | |
| 6,855,386 B1 | 2/2005 | Daniels et al. | |
| 7,070,051 B2 * | 7/2006 | Kanner et al. | 206/382 |
| 7,442,739 B1 | 10/2008 | Hatfield | |
| 7,867,610 B2 | 1/2011 | Takahashi et al. | |
| 7,919,182 B2 | 4/2011 | Hamada et al. | |
| 7,923,503 B2 | 4/2011 | Takahashi et al. | |
| 8,022,125 B2 | 9/2011 | Naito et al. | |
| 8,633,263 B2 | 1/2014 | Jing et al. | |
| 8,846,833 B2 * | 9/2014 | Prenzel | 526/89 |
| 2002/0061945 A1 | 5/2002 | Oates et al. | |
| 2005/0014883 A1 | 1/2005 | Blankenship et al. | |
| 2005/0048303 A1 * | 3/2005 | Henderson et al. | 428/516 |
| 2007/0021566 A1 | 1/2007 | Tse et al. | |
| 2009/0203847 A1 | 8/2009 | Ellis et al. | |
| 2010/0227165 A1 | 9/2010 | Maruyama et al. | |
| 2011/0054117 A1 | 3/2011 | Hall | |
| 2011/0251542 A1 | 10/2011 | Buus et al. | |
| 2012/0189835 A1 * | 7/2012 | Takarada et al. | 428/220 |
| 2013/0202885 A1 | 8/2013 | Dodge et al. | |

FOREIGN PATENT DOCUMENTS

| | | |
|---|---|---|
| CN | 1212007 A | 3/1999 |
| CN | 1278850 A | 1/2001 |

(Continued)

OTHER PUBLICATIONS

Acronal V215 data sheet (2008).*

(Continued)

*Primary Examiner* — Frank D Ducheneaux
(74) *Attorney, Agent, or Firm* — Lorenz & Kopf, LLP

(57) ABSTRACT

A pressure-sensitive adhesion composition comprising: a first polymer that is acrylate polymer or copolymer comprising polymerized monomers selected from the group consisting of acrylic acid, butyl acrylate, 2-ethylhexyl acrylate, methyl methacrylate, octyl acrylate, styrene, vinyl acetate and combinations thereof; and b) a second polymer selected from the group consisting of ethylene-acrylic acid copolymer, oxidized polyethylene, oxidized ethylene-vinyl acetate copolymer, maleated polyolefin and combinations thereof; wherein the composition is water-based and adapted for pressure-sensitive adhesion to substrates. The adhesion composition may also comprise a tackifier resin selected from the group consisting of rosin ester resin, rosin acid resin, synthetic hydrocarbon resin, synthetic terpenic resin and combinations thereof. An article of manufacture comprising a support member and a pressure-sensitive adhesion layer attached thereto that comprises said pressure-sensitive adhesion composition. A process of forming a pressure-sensitive adhesive article of manufacture.

10 Claims, 6 Drawing Sheets

(56) References Cited

FOREIGN PATENT DOCUMENTS

| EP | 0 259 842 A2 | 3/1988 |
| EP | 0259842 B2 | 3/1988 |
| EP | 0259842 B2 | 11/1993 |
| JP | 2001089729 A | 4/2001 |

OTHER PUBLICATIONS

Orgal AX-1260 data sheet (2015).*
Bott et al., "Miscibility of Poly(vinyl acetate) and Vinyl Acetate-Ethylene Copolymers with Styrene-Acrylic Acid and Acrylate-Acrylic Acid Copolymers," Journal of Applied Polymer Science (1995), vol. 58, No. 9, pp. 1593-1605.
Czech, "Crosslinking of Pressure Sensitive Adhesive based on Water-borne Acrylate," Polymer International (2003), vol. 52, No. 3, pp. 347-357.
Litz, "Developments in Ethylene-Based Hot Melt Adhesives," Adhesives Age (1974), vol. 17, No. 8, pp. 35-38.
Yamakawa, "Hot-Melt Adhesive Bonding of Polyethylene With Ethylene Copolymers," Polymer Engineering and Science (1976), vol. 16, No. 6, pp. 411-418.
The International Search Report dated May 7, 2013 in International Application No. PCT/US2013/023382.
"Handbook of Pressure Sensitive Adhesive Technology" Gerhard Auchter et al., BASF AG and Donatas Satas, Satas and Associates Third Edition—Copyright 1999 by Satas & Associates pp. 444-458 with Contents pp. v-viii.
EP Extended Search Report for Application No. EP 13746150.5 dated Jul. 3, 2015.
PCT Written Opinion of the International Searching Authority for Application No. PCT/US 15/25955 dated Jul. 8, 2015.
Chinese Office Action for Patent Application No. 201380017731.0 dated Feb. 23, 2017.
Japan Patent Office, Official Action for Japanese Patent Application No. 2014-556568 dated May 17, 2017.
Extended EP Search Report for Application No. 15780235.6 dated Oct. 26, 2017.
State Intellectual Property Office of the People's Republic of China, Office Action in Chinese Patent Application No. 201380017731.0 dateed Sep. 11, 2017.
Chinese Office Action for Application No. 201580031880.1 dated May 30, 2018.
Mexican Office Action for Application No. 2014/009521 dated Jul. 23, 2018.

* cited by examiner

HIGH PERFORMANCE WATER-BASED TACKIFIED ACRYLIC PRESSURE SENSITIVE ADHESIVES

CROSS REFERENCE TO RELATED APPLICATIONS

The present application claims priority under 35 U.S.C. § 119(e) to U.S. Provisional Patent Application No. 61/596,622, filed on Feb. 8, 2012, the disclosure of which is incorporated herein by reference in its entirety.

FIELD OF THE INVENTION

The invention relates to pressure-sensitive, water-based acrylate adhesives and methods and using the same.

BACKGROUND OF THE INVENTION

Pressure-sensitive adhesives are widely used in the industry. A pressure-sensitive adhesive (PSA) is an adhesive that bonds with an adherent when pressure is applied to it. This contrasts, for example, with adhesives that are activated by heat, irradiation or a chemical reaction.

Pressure-sensitive adhesives can be applied to a support material as an emulsion or dispersion, which is then dried to remove the liquid carrier, or, alternatively, as a solid that is applied in heated form to reduce its viscosity.

Typical PSA compositions for paper labels are water-based dispersions that primarily contain an elastomer and a tackifier. Usually, the elastomer used in these formulations is an acrylate polymer and the tackifier is based on rosin ester. The high molecular weight acrylate polymer provides the formulation with elasticity, cohesion and resistance to shear, while the viscous, low molecular weight tackifier makes the formulation more adhesive.

There remains a need for improved PSA compositions with better adhesion to difficult substrates, like polyethylene, polypropylene and cardboard, and better cohesion and resistance to shear. The present invention addresses this need.

SUMMARY OF THE INVENTION

The present invention provides a pressure-sensitive adhesion composition comprising a) a first polymer that is acrylate polymer or copolymer comprising polymerized monomers selected from the group consisting of acrylic acid, butyl acrylate, 2-ethylhexyl acrylate, methyl methacrylate, octyl acrylate, styrene, vinyl acetate and combinations thereof; and b) a second polymer selected from the group consisting of ethylene-acrylic acid copolymer, oxidized polyethylene, oxidized ethylene-vinyl acetate copolymer, maleated polyolefin and combinations thereof; wherein the composition is water-based and adapted for pressure-sensitive adhesion to substrates.

In certain embodiments of the present invention, the pressure-sensitive adhesion composition further comprises a tackifier resin selected from the group consisting of rosin ester resin, rosin acid resin, synthetic hydrocarbon resin, synthetic terpenic resin and combinations thereof.

In other embodiments of the present invention, the first polymer is present at a concentration of between about 59 weight % and about 98.5 weight % of the total weight of the adhesive; the tackifier is present at a concentration of between about 0.5 weight % and about 40 weight % of the total weight of the adhesive; and the second polymer is present at a concentration of between about 1 weight % and about 17.5 weight % of the total weight of the adhesive.

In other embodiments of the present invention, the ethylene-acrylic acid copolymer has an acid number of between about 40 mgKOH/g and about 200 mgKOH/g determined according to method ASTM D-1386, a hardness at 25° C. of less than about 20 dmm determined according to method ASTM D-5, and a viscosity at 140° C. of between about 200 cps and about 800 cps determined with a Brookfield rotational viscometer; the oxidized ethylene-vinyl acetate copolymer has an acid number of between about 8 mgKOH/g and about 20 mgKOH/g determined according to method ASTM D-1386, a hardness at 25° C. of less than about 10 dmm determined according to method ASTM D-5, and a viscosity at 140° C. of between about 250 cps and about 800 cps determined with a Brookfield rotational viscometer; the oxidized polyethylene has an acid number of between about 10 mgKOH/g and about 21 mgKOH/g determined according to method ASTM D-1386, a hardness at 25° C. of between about 0.5 dmm and about 13 dmm determined according to method ASTM D-5, and a viscosity at 140° C. of between about 100 cps and about 500 cps determined with a Brookfield rotational viscometer; and the maleated polyolefin has an saponification number of between about 5 mgKOH/g and about 100 mgKOH/g determined according to method ASTM D-1386, a hardness at 25° C. of less than about 15 dmm determined according to method ASTM D-5, and a viscosity at 140° C. of between about 500 cps and about 5000 cps determined with a Brookfield rotational viscometer.

In other embodiments of the present invention, the second polymer is ethylene-acrylic acid copolymer.

The present invention further provides an article of manufacture comprising a support member and a pressure-sensitive adhesion layer attached thereto comprising the pressure-sensitive adhesion composition described above.

The present invention further provides a process of forming a pressure-sensitive adhesive article of manufacture comprising a step of applying the pressure-sensitive adhesion composition described above to the support member.

DETAILED DESCRIPTION OF THE INVENTION

Figure 1:
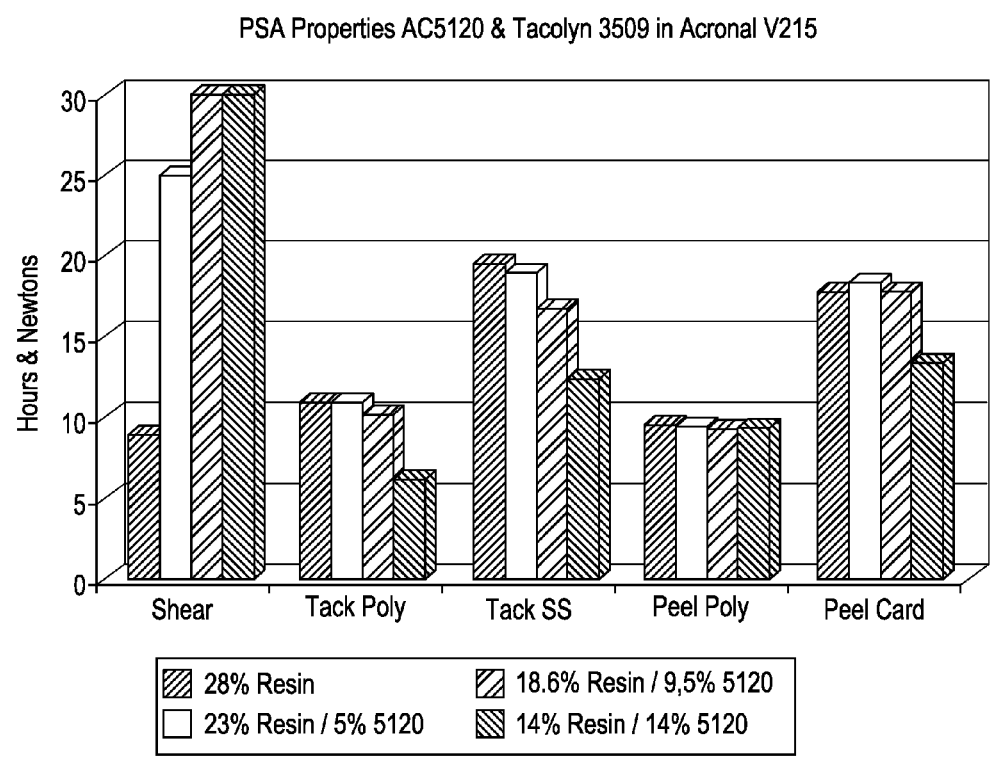
FIG. 1 shows adhesion properties on different substrates of pressure-sensitive adhesives containing about 72 weight % (of the total weight of the adhesive) of the acrylate copolymer commercially available from BASF Corporation, Charlotte, N.C., USA, under the trademark Acronal® V215. In addition, the pressure-sensitive adhesives contain rosin ester resin commercially available from Eastman Chemical Company, Kingsport, Tenn., USA, under the trademark Tacolyn™ 3509 and ethylene-acrylic acid copolymer commercially available from Honeywell International Inc. under the trademark A-C® 5120 in the indicated weight % (of the total weight of the adhesive). The units of measurement are Newton per inch (about 2.5 cm; peel and tack) and hours (shear). The order in which the test results regarding the different adhesives are depicted in the histogram corresponds to the order in which the different adhesives are mentioned in the figure legend below the histogram (left to right, top to bottom; this also applies to FIGS. 2-6 below). The bars reflecting the shear adhesion of the two adhesives containing the highest amounts of the A-C® 5120 product are cut off by the small scale of the histogram of this figure. A larger scale histogram that correctly reflects the shear adhesion of these adhesives is depicted in FIG. 2 below. Shear adhesion was determined based on the adhesion to stainless steel. Loop tack was determined based on the adhesion to low density polyethylene (Tack Poly) or stainless steel (Tack SS). Peel adhesion was determined based on the adhesion to low density polyethylene (Peel Poly) or card board (Peel Card).

Typical pressure-sensitive adhesive compositions contain an acrylate polymer and a tackifier. Acrylate polymers are commonly used to improve cohesion of the pressure-sensitive adhesive and resistance to shear. Tackifiers, on the other hand, are commonly used to improve adhesion. The term tackifier usually refers to a low molecular weight resin with a molecular weight in the range between about 270 and about 1400. Most commercially available tackifiers have a molecular weight that is in the range between about 800 and about 1200. Molecules with molecular weights of greater than about 2000 are normally referred to as polymers. Commercially available tackifiers are commonly based on rosin esters, but might also be based on rosin acids, dimerised rosin acids and certain types of synthetic resins such as terpenic resins and $C_9/C_5$ hydrocarbon resins. Tackifiers are "viscous type structures" as opposed to polymers, which are elastic in nature.

Tackifiers improve peel adhesion to "difficult to bond substrates," such as polyethylene and corrugated paper board, and they also improve quick stick (tack) properties to low energy and high energy surfaces. There are, however, a number of drawbacks to using tackifier resins. Tackifier resins need to be dispersed with a much higher concentration of surfactants than polymer systems. Excess surfactant absorbs moisture, which can negatively impact the convertibility of the pressure-sensitive adhesive. Moreover, resins are super cooled liquids, which exhibit a tendency to flow. This leads to sticky edges and gumming of knives. Additionally, the low molecular weight of resins allows them to migrate into paper substrates, leading to loss of adhesion. This effect is augmented by heat and humidity.

It has now been found that pressure-sensitive adhesives can be manufactured that contain less rosin-based tackifier than many commercially available adhesives and that are therefore less prone to the above mentioned problems. Additionally, the adhesives of the present invention have overall better cohesion and shear resistance, and, at the same time, similar or better adhesion to certain difficult substrates, particularly after aging, than pressure-sensitive adhesives made primarily from acrylate polymer and rosin ester.

The present invention provides a water-based composition that is adapted for pressure-sensitive adhesion to substrates. This composition comprises a first polymer that is acrylate polymer or copolymer comprising polymerized monomers selected from the group consisting of acrylic acid, butyl acrylate, 2-ethylhexyl acrylate, methyl methacrylate, octyl acrylate, styrene, vinyl acetate and combinations thereof. The composition of the present invention also comprises a second polymer selected from the group consisting of ethylene-acrylic acid copolymer, oxidized polyethylene, oxidized ethylene-vinyl acetate copolymer, maleated polyolefin and combinations thereof.

The present invention also provides a water-based composition that is adapted for pressure-sensitive adhesion to substrates. This composition comprises a first polymer that is acrylate polymer or copolymer comprising polymerized monomers selected from the group consisting of acrylic acid, butyl acrylate, 2-ethylhexyl acrylate, methyl methacrylate, octyl acrylate, styrene, vinyl acetate and combinations thereof. The composition of the present invention also comprises a tackifier resin selected from the group consisting of rosin ester resin, rosin acid resin, synthetic hydrocarbon resin, synthetic terpenic resin and combinations thereof. The composition of the present invention also comprises a second polymer selected from the group consisting of ethylene-acrylic acid copolymer, oxidized polyethylene, oxidized ethylene-vinyl acetate copolymer, maleated polyolefin and combinations thereof.

Acrylate polymers (polymers composed of acrylic acid or acrylic acid derivates) and copolymers (co-polymers composed of acrylic acid or acrylic acid derivates) are conventionally used in the art of pressure-sensitive adhesives and the type of acrylate polymer and copolymer that can be used in the present invention is not particularly limited. However, alkyl acrylates and alkyl methacrylates (which, in combination, may be written as alkyl(meth)acrylate) are preferably used as the main monomer component in the acrylate polymers and copolymers of the present invention. These alkyl(meth)acrylates are represented by the following general formula:

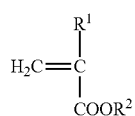

wherein $R^1$ represents a hydrogen atom or a methyl group and $R^2$ represents an alkyl group. Examples of the alkyl group for $R^2$ include alkyl groups (linear or branched alkyl groups) having 1 to 18 carbon atoms, such as a methyl group, an ethyl group, an propyl group, an isopropyl group, a butyl group, an isobutyl group, an s-butyl group, a t-butyl group, a pentyl group, an isoamyl group, a neopentyl group, a hexyl group, a heptyl group, an octyl group, an isooctyl group, a 2-ethylhexyl group, a nonyl group, an isononyl group, a decyl group, an isodecyl group, an undecyl group, a dodecyl group (lauryl group), a tridecyl group, a tetradecyl group, a pentadecyl group, a hexadecyl group, a heptadecyl group, and an octadecyl group (stearyl group).

Examples of the alkyl(meth)acrylate include methyl (meth)acrylate, butyl(meth)acrylate, isobutyl(meth)acrylate, s-butyl(meth)acrylate, t-butyl(meth)acrylate, pentyl(meth) acrylate, isoamyl(meth)acrylate, neopentyl(meth)acrylate, hexyl(meth)acrylate, heptyl(meth)acrylate, 2-ethylhexyl (meth)acrylate, octyl(meth)acrylate, isooctyl(meth)acrylate, nonyl(meth)acrylate, isononyl(meth)acrylate, decyl(meth) acrylate, isodecyl(meth)acrylate, undecyl(meth)acrylate, dodecyl(meth)acrylate, and the like.

In addition to alkyl(meth)acrylate, i.e., the main constituting monomer component, another minor monomer component that is copolymerizable with the alkyl(meth)acrylate can be used. The amount of the alkyl(meth)acrylate with respect to the total amount of monomers constituting the acrylate polymer or copolymer is preferably 50% by weight or more. More than one type of alkyl(meth)acrylate can be used in the same acrylate polymer and copolymer.

The copolymerizable monomer component can be used for introducing a crosslinking site into the acrylate polymer or for enhancing an aggregating ability of the acrylate polymer. One type of several different types of monomers can be used for copolymerization.

In order to introduce a crosslinking site into the acrylate polymer, monomers containing a certain functional group can be used as the copolymerizable monomer component. The use of the functional group-containing monomer component can enhance the adhesive force of the polymer. Such a functional group-containing monomer component is not particularly limited as far as it is a monomer component copolymerizable with the alkyl(meth)acrylate and it has a functional group which becomes a crosslinking site. Non-limiting examples of such monomers include carboxyl group-containing monomers such as (meth)acrylic acid, itaconic acid, crotonic acid, maleic acid, fumaric acid, and isocrotonic acid or acid anhydrides thereof such as maleic anhydride and itaconic anhydride; hydroxyl group-containing monomers, e.g., hydrokyalkyl(meth)acrylates such as 2-hydroxyethyl(meth)acrylate, 2-hydroxypropyl(meth)acrylate, and 2-hydroxybutyl(meth)acrylate and also vinyl alcohol and allyl alcohol; amide-based monomers such as (meth) acrylamide, N,N-dimethyl(meth)acrylamide, N-butyl(meth) acrylamide, N-methylol(meth)acrylamide, N-methylolpropane(meth)acryl-amide, N-methoxymethyl (meth)acrylamide, and N-butoxymethyl(meth)acrylamide; amino group-containing monomers such as aminoethyl (meth)acrylate, N,N-dimethylaminoethyl(meth)acrylate, and t-butylaminoethyl(meth)acrylate; epoxy group-containing monomers such as glycidyl(meth)-acrylate and methylglycidyl(meth)acrylate; cyano-containing monomers such as acrylonitrile and methacrylonitrile; monomers having a nitrogen atom-containing ring, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloylmorpholine; and the like.

In order to enhance the aggregating ability of the acrylate polymer, other copolymerizable monomers can be used. Non-limiting examples of the other copolymerizable monomer component include vinyl ester-based monomers such as vinyl acetate and vinyl propionate; styrene-based monomers such as styrene, substituted styrene (α-methylstyrene, etc.), and vinyltoluene; non-aromatic ring-containing(meth)acrylate esters such as cycloalkyl(meth)acrylates [cyclohexyl (meth)acrylate, cyclopentyl di(meth)acrylate, etc.] and bornyl(meth)acrylate and isobornyl(meth)acrylate; aromatic ring-containing (meth)acrylate esters such as aryl(meth) acrylate [phenyl(meth)acrylate, etc.], aryloxyalkyl(meth) acrylate [phenoxyethyl(meth)acrylate, etc.], and arylalkyl (meth)acrylates [benzyl(meth)acrylate]; olefinic monomers such as ethylene, propylene, isoprene, butadiene, and isobutylene; vinyl chloride and vinylidene chloride; isocyanate group-containing monomers such as 2-(meth)acryloyloxyethyl isocyanate; alkoxy group-containing monomers such as methoxyethyl(meth)acrylate and ethoxyethyl(meth)acrylate; vinyl ether-based monomers such as methyl vinyl ether and ethyl vinyl ether; and also polyfunctional monomers such as 1,6-hexanediol di(meth)acrylate, ethylene glycol di(meth)acrylate, diethylene glycol di(meth)acrylate, triethylene glycol di(meth)acrylate, tetraethylene glycol di(meth) acrylate, polyethylene glycol di(meth)acrylate, propylene glycol di(meth)acrylate, polypropylene glycol di(meth)acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth) acrylate, glycerin di(meth)acrylate, epoxy acrylates, polyester acrylates, urethane acrylates, divinylbenzene, butyl di(meth)acrylate, and hexyl di(meth)acrylate; and the like.

In some embodiments of the present invention, the acrylate polymer or copolymer includes 2-ethylhexyl acrylate and/or butyl acrylate as the main monomer component and methyl methacrylate, vinyl acetate and/or styrene as the minor monomer component.

Processes for polymerizing acrylate polymers and acrylate copolymers are generally known in the art. Non-limiting examples of such processes are emulsion (co)polymerization, solution (co)polymerization, suspension (co)polymerization, all-components-charging processes (at once polymerization processes), and monomer-dropping processes (continuously dropping process, portion-wise dropping process, etc.).

The polymerization initiator to be used is selected from those generally known in the art, according to the type of polymerization process involved. Non-limiting examples of polymerization initiators include azo polymerization initiators such as 2,2'-azobisisobutyronitrile, 2,2'-azobis(2-methylpropion-amidine)disulfate, 2,2'-azobis(2-amidinopropane) dihydrochloride, 2,2'-azobis[2-(5-methyl-2-imidazolin-2-yl) propane]dihydrochloride, 2,2'-azobis(N,N'-dimethyleneisobutylamidine), 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methyl-propionate), and 2,2'-azobis[N-(2-carboxyethyl)-2-methylpropionamidine]hydrate; persulfate salt-based polymerization initiators such as potassium persulfate and ammonium persulfate; peroxide-based polymerization initiators such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, 1,1-bis(t-butylperoxy)cyclododecane, and hydrogen peroxide; substituted ethane-based polymerization initiators such as phenyl-substituted ethane; aromatic carbonyl compounds; and redox system initiators Polymerization initiators may be used alone or in combination of two or more.

The amount of the polymerization initiator to be used may be a usually used amount and can be, for example, selected from the range of about 0.01 to 1 part by weight, preferably 0.02 to 0.5 part by weight relative to 100 parts by weight of the total monomer components to be polymerized.

The polymerization temperature is selected according to the type of monomer, the type of initiator, and the like, used and can be, for example, in the range between 20° C. and 100° C.

The acrylate polymer and acrylate copolymer compositions may be dispersed or emulsified in a medium, for example water. Any suitable emulsifier may be used for that purpose. Non-limiting examples of anionic emulsifiers include alkyl sulfate salt-type anionic emulsifiers such as sodium lauryl sulfate, ammonium lauryl sulfate, and potassium lauryl sulfate; polyoxyethylene alkyl ether sulfate salt-type anionic emulsifiers such as sodium polyoxyethylene lauryl ether sulfate; polyoxyethylene alkylphenyl ether sulfate salt-type anionic emulsifiers such as ammonium polyoxyethylene laurylphenyl ether sulfate and sodium polyoxyethylene laurylphenyl ether sulfate; sulfonate salt-type anionic emulsifiers such as sodium dodecylbenzenesulfonate; sulfosuccinate-type anionic emulsifiers such as disodium lauryl sulfosuccinate and disodium lauryl polyoxy-ethylenesulfosuccinate; and the like. Moreover, non-limiting examples of nonionic emulsifiers include polyoxyethylene alkyl ether-type nonionic emulsifiers such as polyoxyethylene lauryl ether; polyoxyethylene alkylphenyl ether-type nonionic emulsifiers such as polyoxyethylene laurylphenyl ether; nonionic emulsifiers such as polyoxyethylene fatty acid esters, polyoxyethylene-polyoxypropylene block polymers; and the like.

The amount of the emulsifier to be used is not particularly limited as far as it is an amount capable of preparing the acrylate polymer or acrylate copolymer in an emulsion form. For example, the amount can be selected from the range of about 0.3 to 10 parts by weight, preferably about 0.5 to 5 parts by weight relative to 100 parts by weight of the acrylate polymer or acrylate copolymer, or monomer components thereof.

An acrylate copolymer widely used in the art of pressure-sensitive adhesives can be obtained from BASF Corporation, Charlotte, N.C., USA, under the trademark Acronal® V215. Acronal® V215 has the following specifications: the solids content is 68 to 70%; the pH value is 3.5 to 6.0; the viscosity at 23° C. (Brookfield RVT, Spindle #3, at 50 rpm) is 400 to 2000 cps; the density is about 8.4 lb/gal; the viscosity at 23° C. (shear rate 100 sec−1) is 200 to 1000 cps; the mean particle size is about 0.6 µm; the dispersion type is anionic; and the glass transition temperature (DSC) is about 43° C.

Another acrylate copolymer used in the art of pressure-sensitive adhesives can also be obtained from Organic Kimya, Turkey, under the name Orgal AX1260.

Tackifiers are conventionally used in the art of pressure-sensitive adhesives and the type of tackifier that can be used in the present invention is not particularly limited. Non-limiting examples of possibly suitable tackifiers include rosin-based tackifying resins, terpene-based tackifying resins, hydrocarbon-based tackifying resins, epoxy-based tackifying resins, polyamide-based tackifying resins, elastomer-based tackifying resins, phenol-based tackifying resins, ketone-based tackifying resins, and the like. The tackifying resin can be used solely or in combination of two or more thereof.

Rosin is a solid form of resin obtained primarily, but not exclusively, from conifers (rosin obtained from this source is sometimes called gum rosin). Other sources of rosin include rosin obtained from the distillation of crude tall oil (called tall oil rosin). Rosin may also be obtained from aged pine stumps, in which case it is typically called wood rosin. Rosin primarily consists of different rosin acids, especially abietic acid, neoabietic acid, palustric acid, levopimaric acid, dehydroabietic acid, pimaric acid, sandaracopimaric acid and isopimaric acid.

Rosin-based tackifier resins can include unmodified rosins (raw rosins) such as gum rosins, wood rosins, and tall oil rosins and rosins modified by hydrogenation, disproportionation, polymerization or other processes. Non-limiting examples of rosin derivatives include rosin esters obtained by esterifying unmodified rosins and rosin esters obtained by esterifying modified rosins, including, for example, hydrogenated rosins, disproportionated rosins, polymerized rosins, and the like; unsaturated fatty acid-modified rosins obtained by modifying unmodified rosins or modified rosins (hydrogenated rosins, disproportionated rosins, polymerized rosins, and the like) with unsaturated fatty acids; unsaturated fatty acid-modified rosin esters obtained by modifying rosin esters with unsaturated fatty acids; rosin alcohols obtained by reducing the carboxyl group in unmodified rosins, modified rosins (hydrogenated rosins, disproportionated rosins, polymerized rosins, and the like), unsaturated fatty acid-modified rosins, or unsaturated fatty acid-modified rosin esters; metal salts of rosins (in particular, rosin esters) including unmodified rosins, modified rosins, and various rosin derivatives; and the like. In addition, there can be used rosin phenol resins obtained by adding phenol to rosins (unmodified rosins, modified rosins, and various rosin derivatives, and the like) in the presence of an acid catalyst, followed by thermal polymerization. Rosin-based tackifying resins, and their manufacture, are well known to those skilled in the art. Therefore, these resins and their manufacture are not described herein in greater detail.

Rosin acids and rosin acid-based resins are known to the person of skill in the art and commercially available from many sources, for example DRT (France), Euro-Yser (Portugal), Harima Chemicals, Inc. (Japan), and Eastman Chemical Company (USA).

Rosin ester resins are commercially available, for example, from Eastman Chemical Company, Kingsport, Tenn., USA, under the trademark Tacolyn™ 3509. Tacolyn™ 3509 resin dispersion is an anionic, aqueous, 55% solids, solvent-free dispersion of a stabilized rosin ester with low surface tension. Tacolyn™ 3509 resin dispersion has the following specification: the average particle size is typically 200 nm; the softening point (Hercules drop method) is 68-78° C.; the total solids content is 54-56%; the viscosity, Brookfield LVTD, 60 rpm, at 25° C. is 100-500 mPa·s; and the density is typically 1.05 g/mL.

Rosin dispersion is commercially available, for example, from Arizona Chemical, FL, USA, under the trademark Aquatac™ XR 4343, which has the following specification: the ring and ball softening point is about 80° C.; the solids content is about 60%; the pH is typically 8.5; and the viscosity is typically between 500 and 700 cps at Brookfield #3 spindle at 50 rpm at 21° C.

Synthetic hydrocarbon resins are the products of the polymerization of the C9 or C9/C5 by-product fractions derived from the cracking or chemical treatment of petroleum. These types of resins are known in the art and commercially available from many sources (e.g., Eastman Chemical Company, Kingsport, Tenn., USA, under the trademark Tacolyn™ 1070).

Synthetic terpenic resins are dispersions of terpene and phenol, or terpene and styrene or styrene-derivatives. These types of resins are known in the art and commercially available from many sources (e.g., DRT, France, and Arizona Chemical, FL, USA).

The tackifier may have a form constituted by the tackifying resin alone or may be dissolved or dispersed in a medium like water. The water-dispersion type tackifier can be prepared by dissolving or melting the tackifying resin and subsequently dispersing it in water. An emulsifier can be employed for the dispersion of the tackifying resin in water. Any suitable type of emulsifier may be used. Non-limiting examples of anionic emulsifiers include alkyl sulfate salt-type anionic emulsifiers such as sodium lauryl sulfate, ammonium lauryl sulfate, and potassium lauryl sulfate; polyoxyethylene alkyl ether sulfate salt-type anionic emulsifiers such as sodium polyoxyethylene lauryl ether sulfate; polyoxyethylene alkylphenyl ether sulfate salt-type anionic emulsifiers such as ammonium polyoxyethylene laurylphenyl ether sulfate and sodium polyoxyethylene laurylphenyl ether sulfate; sulfonate salt-type anionic emulsifiers such as sodium dodecylbenzenesulfonate; sulfosuccinate-type anionic emulsifiers such as disodium lauryl sulfosuccinate and disodium lauryl polyoxyethylenesulfosuccinate; and the like. Non-limiting examples of the nonionic emulsifiers include polyoxyethylene alkyl ether-type nonionic emulsifiers such as polyoxyethylene lauryl ether; polyoxyethylene alkylphenyl ether-type nonionic emulsifiers such as polyoxyethylene laurylphenyl ether; nonionic emulsifiers such as polyoxyethylene fatty acid esters, polyoxyethylene-polyoxypropylene block polymers; and the like. Surfactants may also be used for the dispersion of the tackifying resin in water or other medium.

The amount of the emulsifier to be used is not particularly limited as far as it is an amount capable of preparing the tackifying resin in an emulsion form. For example, the amount can be selected from the range of about 0.2 to 10% by weight, preferably from 0.5 to 5% by weight, based on the total amount of the tackifying resin (solid matter).

The emulsifier used for the preparation of the water-dispersion type tackifier can be the same as or different from the emulsifier used for the preparation of the water-dispersion type acrylate polymer or acrylate copolymer mentioned above.

The ratio by weight between the acrylate polymer and the tackifier resin in the pressure-sensitive adhesive is not particularly limited and can be selected according to the degree of adhesiveness that the pressure-sensitive adhesive is desired to have. In some embodiments of the present invention, the ratio by dry weight between the acrylate polymer (or acrylate copolymer) and the tackifier resin is between about 9:1 and about 8:1. In other embodiments, the ratio is between about 8:1 and about 7:1 between about 7:1 and about 6:1, between about 6:1 and about 5:1, between about 5:1 and about 4:1, between about 4:1 and about 3:1, between about 3:1 and about 2:1, between about 2:1 and about 1:1, between about 1:1 and about 1:2, and between about 1:2 and about 1:3.

The second polymer of the present invention is selected from the group consisting of ethylene-acrylic acid copolymer, oxidized polyethylene, oxidized ethylene-vinyl acetate copolymer, maleated polyolefin and combinations thereof. Ethylene-acrylic acid copolymers are well known to those skilled in the art, as is their manufacture. These copolymers are used for numerous applications. For example, these copolymers are used as adhesives, as coatings and as inks Ethylene-acrylic acid copolymers are made by polymerization of ethylene and acrylic acid monomers, usually using a free radical initiator. The acrylic acid content of the copolymer contributes to the copolymer's polarity and adhesion and lowers its crystallinity. As the content of the acrylic acid monomer subunits in the polymer increases, the crystallinity of ethylene-acrylic acid copolymers decreases. The amount of acrylic acid monomer subunits in the copolymers, or the copolymers' acid number, is determined by method ASTM D-1386. Polymers with high acid number contain high content of acrylic acid monomers. Commercial grades of ethylene-acrylic acid copolymers are available in acid numbers from about 40 to 200 mgKOH/g. The acidic group in the ethylene-acrylic acid copolymers provides reactive sites for the manufacture of water based emulsions. The number average molecular weight (Mn) of ethylene-acrylic acid copolymers commonly ranges from 1,500 to 3,000 and their weight average molecular weight (Mw) commonly ranges from 2,000 to 6,000. The molecular weight of ethylene-acrylic acid copolymers is determined by Gel Permeation Chromatography (GPC). The density of the polymers commonly ranges from 0.90-1.00 g./cc as determined by method ASTM D-1505. The Mettler Drop point of the polymers commonly ranges from 70° C.-110° C. as determined by method ASTM D-3954. The viscosity at 140° C. of ethylene-acrylic acid copolymers commonly ranges from 200-1,000 cps as determined by a Brookfield rotational viscometer. The hardness of the ethylene-acrylic acid copolymers at 25° C. commonly ranges from 1-50 dmm as determined by method ASTM D-5.

Ethylene-acrylic acid copolymer is commercially available, for example, from Honeywell International Inc. under the trademark A-C® 5120. A-C® 5120 has the following specification: the acid number is 112 to 130 mgKOH/g; the hardness at 25° C. is less than 15 dmm; the viscosity at 140° C. (Brookfield) is 600 cps; the drop point (Mettler) is 92° C.; and the density is 0.93 g/cc.

Oxidized ethylene-vinyl acetate copolymers are well known to those skilled in the art, as is their manufacture. Oxidized ethylene-vinyl acetate copolymers contain polar groups, such as carboxylic acid, hydroxyl, ketone and ester groups, in the polymer molecule. The polymers are made by oxidation of ethylene-vinyl acetate copolymers with oxygen at elevated temperatures. Oxidized ethylene-vinyl acetate copolymers are semi-crystalline materials, which contain a variety of polar groups besides carboxylic acid, all of which contribute to the adhesion and water compatibility of the oxidized ethylene-vinyl acetate copolymer. These copolymers are used for numerous applications. For example, these copolymers are used as adhesives, as coatings and as inks. The acid content in oxidized ethylene-vinyl acetate copolymers, or the copolymers' acid number, is determined by method ASTM D-1386. Commercial grades of ethylene-vinyl acetate copolymers are commonly available in acid numbers from about 8-30 mgKOH/g. The acidic groups in the copolymers provides reactive sites for making water based emulsions. The number average molecular weight (Mn) of oxidized polyethylenes commonly ranges from 1,500 to 4,000 and their weight average molecular weight (Mw) commonly ranges from 4,000 to 15,000. The molecular weight of oxidized ethylene-vinyl acetate copolymers is determined by Gel Permeation Chromatography (GPC). The density of the copolymers commonly ranges from 0.85-1.00 g./cc as determined by method ASTM D-1505. The Mettler drop point of the copolymers commonly ranges from 75° C.-110° C. as determined by method ASTM D-3954. The viscosity at 140° C. of the copolymers ranges from 250 to 1,500 cps as determined by a Brookfield rotational viscometer. The hardness of the polymers commonly ranges from 3-80 dmm as determined by method ASTM D-5.

Oxidized ethylene-vinyl acetate copolymer is commercially available from, for example, Honeywell International Inc. under the trademark A-C® 645P. A-C® 645P has the following specification: the acid number is 12 to 16 mgKOH/g; the hardness at 25° C. is 4 to 7 dmm; the viscosity at 140° C. (Brookfield) is 375 cps; the drop point (Mettler) is 99° C.; and the density is 0.94 g/cc.

Oxidized polyethylenes are well known to those skilled in the art, as is their manufacture. Oxidized polyethylenes contain polar groups, such as carboxylic acid, ketone, hydroxyl and ester groups, which contribute to adhesion and water compatibility of the polymer. The oxidized polyethylenes are made by oxidation of polyethylenes (low density, medium density and high density types) with oxygen at elevated temperatures. Oxidized polyethylenes are semi-crystalline materials. These polymers are used for numerous applications. For example, these copolymers are used as adhesives, as coatings and as inks. The acid content in these polymers, or the polymers' acid number, is determined by method ASTM D-1386 method. Commercial grades of oxidized polyethylenes are commonly available in acid numbers from about 10 to 45 mgKOH/g. The acidic groups in the polymers provides reactive sites for making water based emulsions. The number average molecular weight (Mn) of oxidized polyethylenes commonly ranges from 800 to 6,000 and their weight average molecular weight (Mw) commonly ranges from 1,500 to 20,000. The molecular weight of oxidized polyethylenes is determined by Gel Permeation Chromatography (GPC). The density of the polymers commonly ranges from 0.85 to 1.00 g./cc as determined by method ASTM D-1505. The Mettler drop point of the polymers ranges from 85° C. to 145° C. as determined by method ASTM D-3954. The viscosity at 140° C. of the polymers commonly ranges from 35 to 100,000 cps as determined by a Brookfield rotational viscometer. The hardness of the polymers commonly ranges from less than 0.5 to 100 dmm as determined by method ASTM D-5.

Oxidized polyethylene polymer is commercially available from, for example, Honeywell International Inc. under the trademark A-C® 655. A-C® 655 has the following specification: the acid number is 14 to 17 mgKOH/g; the hardness at 25° C. is 2 to 3 dmm; the viscosity at 140° C. (Brookfield) is 210 cps; the drop point (Mettler) is 107° C.; and the density is 0.93 g/cc. Another oxidized polyethylene polymer commercially available from Honeywell International Inc. is oxidized polyethylene sold under the trademark A-OO 656. A-C® 656 has the following specification: the hardness at 25° C. is 8 to 12 dmm; the drop point (Mettler) is 98° C.; the density is 0.92 g/cc; the viscosity at 140° C. (Brookfield) is 185 cps; and the acid number is 14 to 17 mgKOH/g.

Maleated polyolefins are well known to those skilled in the art, as is their manufacture. Maleated polyolefins contain polar groups in the polymer molecule. Maleated polyolefins can be made by grafting maleic anhydride to polyolefins with a peroxide. Maleated polyolefins are semi-crystalline materials. They are used for numerous applications. For example, these polymers are used as adhesives, as coatings and as inks Maleic anhydride contributes polarity, adhesion and lowers crystallinity. The maleic anhydride content in the polymers, or their saponification number or acid number, is determined by method ASTM D-1386 method. Polymers with high saponification number contain a high content of maleic anhydride. Commercial grades of maleated polyolefins are commonly available in saponification number from about 5 to 100. The maleic anhydride group in the polymer provides reactive sites for making water based emulsions of the polymer. The number average molecular weight (Mn) of maleated polyolefins commonly ranges from 2,000 to 6,000 and their weight average molecular weight (Mw) commonly ranges from 5,000-20,000. The molecular weight is determined by Gel Permeation Chromatography (GPC). The density of the polymers commonly ranges from 0.90 to 1.00 g./cc as determined by method ASTM D-1505. The Mettler drop point of the polymers commonly ranges from 100° C. to 160° C., as determined by method ASTM D-3954. The viscosity at 140° C. of the maleated polyethylenes commonly ranges from 500 to 5,000 cps as determined by a Brookfield rotational viscometer. The viscosity at 190° C. of the maleated polypropylenes commonly ranges from 300 to 3,000 cps as determined by a Brookfield rotational viscometer. The hardness of the polymers ranges from less than 0.5 to 15 dmm as determined by method ASTM D-5.

Maleated polyolefin is commercially available from, for example, Honeywell International Inc.

Non-limiting examples of processes of making a combination, mixture, dispersion or emulsion of acrylate polymer or acrylate copolymer, rosin esters and the second polymer of the present invention are described in the Examples below.

In some embodiments of the present invention, the first polymer is present at a concentration of between about 59 weight % and about 99 weight % of the total weight of the adhesive; the tackifier is present at a concentration of between about zero weight % and about 40 weight % of the total weight of the adhesive; and the second polymer is present at a concentration of between about 1 weight % and about 17.5 weight % of the total weight of the adhesive. In other embodiments of the present invention, the first polymer is present at a concentration of between about 59 weight % and about 65 weight % of the total weight of the adhesive. In other embodiments of the present invention, the first polymer is present at a concentration of between about 65 weight % and about 75 weight % of the total weight of the adhesive. In other embodiments of the present invention, the first polymer is present at a concentration of between about 75 weight % and about 85 weight % of the total weight of the adhesive. In other embodiments of the present invention, the first polymer is present at a concentration of between about 85 weight % and about 99 weight % of the total weight of the adhesive. In some embodiments of the present invention, the tackifier is present at a concentration of between about zero weight % and about 10 weight % of the total weight of the adhesive. In other embodiments of the present invention, the tackifier is present at a concentration of between about 10 weight % and about 20 weight % of the total weight of the adhesive. In other embodiments of the present invention, the tackifier is present at a concentration of between about 20 weight % and about 30 weight % of the total weight of the adhesive. In other embodiments of the present invention, the tackifier is present at a concentration of between about 30 weight % and about 40 weight % of the total weight of the adhesive. In some embodiments of the present invention, the second polymer is present at a concentration of between about 1 weight % and about 4 weight % of the total weight of the adhesive. In other embodiments of the present invention, the second polymer is present at a concentration of between about 4 weight % and about 8 weight % of the total weight of the adhesive. In other embodiments of the present invention, the second polymer is present at a concentration of between about 8 weight % and about 12 weight % of the total weight of the adhesive. In other embodiments of the present invention, the second polymer is present at a concentration of between about 13 weight % and about 17.5 weight % of the total weight of the adhesive. In other embodiments of the present invention, the second polymer is present at a concentration of between about 17.5 weight % and about 30 weight % of the total weight of the adhesive.

The present invention provides an article of manufacture comprising a support member and a layer of the pressure-sensitive adhesive set forth above. A pressure-sensitive adhesive layer can be formed by applying, on a predetermined surface, an acrylic pressure-sensitive adhesive, followed by drying or curing. For the application of the acrylic pressure-sensitive adhesive, a conventional coater, e.g., a gravure roll coater, a reverse roll coater, a kiss roll coater, a dip roll coater, a bar coater, a knife coater, a spray coater, or the like, can be employed. In some embodiments of the present invention, the thickness of the adhesive layer is in the range of between about 2 μm and about 150 μm. In other embodiments of the present invention, the thickness of the adhesive layer is in the range of between about 10 μm and about 100 μm. In other embodiments of the present invention, the thickness of the adhesive layer is in the range of between about 30 μm and about 60 μm. In other embodiments of the present invention, the thickness of the adhesive layer is in the range of between about 1 μm and about 10 μm. In other embodiments of the present invention, the thickness of the adhesive layer is in the range of between about 10 μm and about 30 μm. In other embodiments of the present invention, the thickness of the adhesive layer is in the range of between about 30 μm and about 50 μm. In other embodiments of the present invention, the thickness of the adhesive layer is in the range of between about 50 μm and about 70 μm. In other embodiments of the present invention, the thickness of the adhesive layer is in the range of between about 70 μm and about 90 μm. In other embodiments of the present invention, the thickness of the adhesive layer is in the range of between about 90 μm and about 110 μm. In other embodiments of the present invention, the thickness of the adhesive layer is in the range of between about 110 μm and about 130 μm. In other embodiments of the present invention, the thickness of the adhesive layer is in the range of between about 130 μm and about 150 μm. Other thicknesses may be chosen by the person of ordinary skill in the art depending on the circumstances.

The pressure-sensitive adhesive may be attached to a support member to form a pressure-sensitive adhesive sheet or tape that has a layer of the pressure-sensitive adhesive on one or both surfaces of the support member. The pressure-sensitive adhesive may also be applied to a release liner to form a pressure-sensitive adhesive layer that is not attached to a support member. The pressure-sensitive adhesive layer is not limited to a continuously formed pressure-sensitive adhesive layer, and may be a pressure-sensitive adhesive layer formed in a regular or random pattern such as a dotted pattern, a stripe pattern, and the like.

Depending on the application of the pressure-sensitive adhesive sheet or tape, an appropriate support member can be chosen and used from, for example, plastic films such as polypropylene films, ethylene/propylene copolymer films, polyester films or poly(vinyl chloride) films; foam support members such as polyurethane foams or polyethylene foams; papers such as craft paper, crepe paper or Japanese paper; fabrics such as cotton fabrics or staple-fiber fabrics; nonwoven fabrics such as polyester nonwoven fabrics or vinylon nonwoven fabrics; and metal foils such as aluminum foils or copper foils. Either unstretched films or stretched (uniaxially stretched or biaxially stretched) films can be used as the plastic film. The side of the support member to which the pressure-sensitive adhesive layer is applied may have undergone surface treatments such as a primer coating or a corona discharge treatment. The thickness of the support member is selected according to the specific application and is generally between about 10 μm and about 500 μM. In some embodiments of the present invention, the thickness of the support member is between about 20 μm and about 50 μM. In other embodiments of the present invention, the thickness of the support member is between about 50 μm and about 100 μM. In other embodiments of the present invention, the thickness of the support member is between about 100 μm and about 200 μM. In other embodiments of the present invention, the thickness of the support member is between about 200 μm and about 400 μM.

The surface of the support member may be subjected to a suitable known or conventional surface treatment, e.g., a physical treatment such as a corona discharge treatment or a plasma treatment, a chemical treatment such as an under coat treatment or a backside-treatment, or the like.

The release liner that can be used is not particularly limited and can be selected from release liners commonly known in the art. A material having been treated with a release treatment agent on at least one surface can be used as a release liner. In addition, low-adhesive materials composed of fluorocarbon polymers (e.g., polytetrafluoroethylene, polychlorotrifluoro-ethylene, polyvinyl fluoride, polyvinylidene fluoride, a tetrafluoroetylene-hexafluoropropylene copolymer, a chlorofluoroethylene-vinylidene fluoride copolymer, etc.) and low-adhesive materials composed of non-polar polymers (e.g., olefin-based resins such as polyethylene and polypropylene) can be also employed.

Plastic sheets or films, papers, fabrics, rubber sheets, foam sheets, metal foils, and the like can be also used for the manufacture of release liners.

The thickness of the release layer in the release liner is not particularly limited and can be suitably selected according to the specific purpose of its use.

Pressure-sensitive adhesive tapes are commonly subjected to a number of tests that are routinely done in the art to determine the tapes' properties. One of these routinely performed tests measures the tape's resistance to shear. Shear adhesion (shear resistance) is the ability of a pressure-sensitive adhesive tape to remain adhered under a constant load applied parallel to the surface of the tape and substrate. In summary, the test is conducted by applying a strip of tape to a standard steel panel under controlled roll down. The panel is then mounted vertically and a standard mass is attached to the free end of the tape and the time required for complete detachment of the tape is determined. A more detailed description of this test is provided below. For this test, a panel at least 50 mm long and 50 mm wide and not less than 1.1 mm thick is used. The panel should be made of stainless steel 302 or 304 in accordance with specification EN 10088/2, 2R that has a bright annealed finish. The surface roughness height is 50±25 nm arithmetical average deviation from the mean line. Before use, the steel panel is cleaned with diacetone alcohol (technical grade or better), methanol (95%), methyl ethyl ketone (MEK), n-heptane or acetone. The steel panel is then wiped to dryness with fresh absorbent cleaning material, e.g., surgical gauze, cotton wool or tissue. To be suitable, cleaning materials must be lint-free during use, contain no additives that are soluble in the above listed solvents and made exclusively from virgin materials. The cleaning procedure is repeated three times. MEK or acetone is used for the final cleaning before each test. Panels not used within 10 hours are recleaned. Panels showing stains, discoloration or many scratches are discarded. Panels are protected from damage or contamination during storage and contact with fingers should be avoided. The tape roll (see below) is conditioned and the test conducted at 23±1° C. and 50±5% relative humidity. The tape specimen is removed from a freely rotating tape roll at a rate of 500 to 700 mm/s and applied to the steel panel within five minutes. The tape specimen is 12 mm wide and 150 mm long. The tape specimen is centered at one end of the test panel and applied without added pressure to cover an area exactly 12×12 mm. The remaining part of the tape is protruding over the edge of the panel and the exposed adhesive of the free area of the tape is masked. The part of the tape attached to the steel panel is then subjected twice to a roll down in lengthwise direction. Each tape specimen is individually prepared and tested within one minute. A clamp is placed on the masked free end of the specimen, ensuring that the clamp extends completely across the width of the specimen and is aligned to uniformly distribute the load. The test assembly is placed in the test stand so that the part of the test specimen attached to the steel panel is at a 2° angle with respect to the vertical and the tape's free end is completely vertical. A 1000 g mass is applied to the clamp gently so as not to cause any impact force on the tape specimen. The time that elapses until the specimen has completely separated from the test panel is then measured.

Another routinely performed test measures peel adhesion. Peel adhesion is the force required to remove, i.e., peel, a pressure sensitive tape from a surface. In summary, this test is conducted by applying a strip of tape to a standard test panel (or other surface of interest) with controlled pressure. The tape is peeled from the panel at a 180° angle at a specified rate, during which time the force required to effect the tape's removal is measured. A more detailed description of this test is provided below. For this test, a panel at least 120 mm long and 50 mm wide and not less than 1.1 mm thick is used. The panel should be made of stainless steel 302 or 304 in accordance with specification ASTM A 666 that has a bright annealed finish. The surface roughness height is 50±25 nm arithmetical average deviation from the mean line. Before use, the steel panel is cleaned with diacetone alcohol (technical grade or better), methanol (95%), methyl ethyl ketone (MEK), n-heptane or acetone. The steel panel is then wiped to dryness with fresh absorbent cleaning material, e.g., surgical gauze, cotton wool or tissue. To be suitable, cleaning materials must be lint-free during use, contain no additives that are soluble in the above listed solvents and made exclusively from virgin materials. The cleaning procedure is repeated three times. MEK or acetone is used for the final cleaning before each test. The steel panel is allowed to dry for at least 10 minutes. Panels not used within 10 hours are recleaned. Panels showing stains, discoloration or many scratches are discarded. Panels are protected from damage or contamination during storage and contact with fingers should be avoided. A tape specimen that is 24 mm wide and 300 mm long is removed from a freely rotating tape roll at a rate of 500 to 700 mm/s and applied to the panel within five minutes. A 12 mm long tab is formed by folding back one end of the tape and the other end of the tape specimen is adhered to an end of the test panel. The tape in-between is then applied to the panel by rolling a roller over it twice in lengthwise direction. The roller, made out of steel, is 45±1.5 mm wide and 85±2.5 mm in diameter and covered with rubber which is approximately 6 mm in thick and which has a Shore scale A durometer hardness of 80±5. The surface is a true cylinder void of any convex or concave deviations. The roller has a mass of 2040±45 g and moves mechanically at the rate of 10±0.5 mm/s. Each tape specimen is individually prepared and tested within one minute. The folded end of the tape is doubled back at an angle of 180° and 24 mm of the tape are peeled from the panel. The adhesion testing machine used is an electronic constant-rate-of-extension (eRE) tension tester, which takes at least one reading per mm tape peeled. The tester has two clamps (jaws) that are so aligned that they hold the specimen wholly in the same plane; a means of moving the stressing clamp at a uniform rate of 5.0±0.2 mm/s; and a device for recording load. The tester is calibrated to an accuracy of 0.5% of full scale and the scale range used for any test is such that the mean test level falls within 20 to 80% of the full scale. The end of the panel is clamped into the movable jaw of the adhesion testing machine and the free end of the tape into the other jaw. The movable jaw is operated at 5.0±0.2 mm/s. After the movable jaw has started its motion, the values obtained while the first 24 mm of tape are mechanically peeled are disregarded. The average force required for peeling the next 48 mm of tape are used as the adhesion value, which is calculated in Newtons/inch (about 2.5 cm).

Another routinely performed test measures the pressure-sensitive tape's loop tack. In summary, this test is conducted by allowing a loop of pressure sensitive-adhesive tape to be brought into controlled contact with a 24 mm×24 mm (one square inch) surface of stainless steel, with the only force applied being the weight of the pressure-sensitive tape itself. The tape is then removed from the steel, and the force required for removal measured by a recording instrument. A more detailed description of this test is provided below. The sample is cut into 24 mm×175 mm specimen strips in the machine direction of the pressure sensitive article. Specimens to be tested are then conditioned for at least 24 hours in the testing room at 23±2° C. (73.4±3.6° F.) and a relative humidity of 50±5% prior to conducting the test. The tensile tester (made by Instron®) is calibrated according to instructions supplied by the manufacturer. The instrument crosshead is set at a speed of 300 mm (12 inches) per minute. The stainless steel portion of the test fixture (the area the pressure sensitive article will contact) is cleaned using an appropriate reagent, for example acetone, methyl ethyl ketone, diacetone alcohol, n-heptane and toluene, reagent or analytical grade, or an ethanol cleaner for water-based adhesives. The panel is then cleaned as described above in connection with the determination of shear resistance. After cleaning, any remaining traces of cleaning solvent are then allowed to evaporate for two minutes. The test panel is placed in the lower grip of the tensile tester. The specimen is bent completely back on itself so that it forms a teardrop-shaped loop with the adhesive surface facing out. The ends of the loop are fastened together using a strip of masking tape 24 mm (1 inch) wide. The masking tape covers the ends of the loop, preventing contamination of the grips of the tensile tester. The tape end of the specimen loop is then inserted into the upper grips of the tensile tester. The tensile tester is then activated so that its crosshead moves downward. As a result, the mid-section of the specimen loop contacts the center of the stainless steel portion of the test fixture. When the crosshead is at its minimum position, the specimen loop completely covers the 1 square inch (645 square mm) area of the stainless steel portion of the test fixture without excessive "hang-over" of the edges. When the crosshead reaches its minimum position, it immediately switches direction and moves upward. The maximum force required to remove the specimen loop from the stainless steel portion of the test fixture is then recorded (in Newtons per inch (about 2.5 cm)). The procedure is repeated at least two additional times for each adhesive to be tested (for a minimum of three replicates). A fresh specimen strip is used for each test.

The term wax as used herein refers to the polymer products commercially available from Honeywell International Inc. under the following trademarks: A-C® 5120, A-00 645P, A-00 655 and A-00 656.

The following examples further illustrate the invention, but should not be construed to limit the scope of the invention in any way.

EXAMPLES

Example 1—Preparation of Pressure-Sensitive Adhesives Ad Pressure-Sensitive Adhesive Labels A jacketed vessel was pre-heated to a temperature of 95-100° C. The temperature was controlled by an oil jacket, which contained oil at a temperature of about 115-120° C. 320 g of water was then added to the vessel and the temperature was adjusted to 96-99° C. Stirring (using Lightning RS500 saw tooth type blades) was commenced and a small amount potassium hydroxide was added and mixed with the water for 5 minutes. A small amount of the surfactant J-Phos 1066 (commercially available from J1 Technologies Ltd., Manchester, UK), which contains an alkylether phosphate ester and phosphoric acid, was then added and mixed with the water for 5 minutes to form the aqueous phase of the emulsion. Ethylene-acrylic acid copolymer commercially available from Honeywell International Inc. under the trademark A-C® 5120, or a 25:75 mixture of said copolymer and the oxidized polyethylene polymer commercially available from Honeywell International Inc. under the trademark A-C® 656 was pre-melted with additives (5% w/w of Technical White Oil) at a temperature of about 110-115° C. The material, once molten, was then mixed with low speed agitation. The stirring speed was then increased to 960-1000 RPM and this molten wax phase was added, over a period of 3-5 minutes, to the center of the mixer containing the aqueous phase (see above). The temperature was maintained at 97-99° C. A pre-emulsion was thus formed at this stage and was mixed for another 5 minutes. 16 g of potassium hydroxide was added over a period of 1-2 minutes. At this stage a gradual increase in viscosity was observed as more potassium hydroxide was added. Mixing continued for another 5 minutes. The average particle size of the resulting emulsion was in the range of 0.3-0.6 microns. The pH of this high viscosity emulsion was then adjusted without affecting the particle size. Specifically, a small amount of 85% acetic acid in an amount of 1% of the total emulsion (v/v) was added to 60 g of hot water (temperature was in the range of 80-90° C.) in a separate vessel and the resulting mixture was stirred. This diluted acetic acid was then added to the viscous emulsion (see above) over a period of 1-2 minutes. The emulsion became thinner and its viscosity was dramatically reduced. The final product was initially cooled using the vessel jacket and then flash cooled in a sink or in-line cooler to 35° C. A small amount of biocide was added to the product once the temperature was below 35° C. The product was then filtered through 200 microns filter. The final specification was as follows: the solids content was about 56%; the viscosity was 350 to 1500 cps (60 RPM Brookfield no. 3 spindle); the pH was 8-8.5; the particle size was 0.35 to 0.6 microns (×50). The emulsion of the other waxes described herein (A-C® 655, A-C® 645P) can be done in a similar fashion.

The acrylate polymer or copolymer was then adjusted to pH 7.5-8.0 and the dispersed tackifier resin added slowly over a period of 1-2 minutes with low speed stirring (200-400 RPM). After 5 minutes, the wax emulsion (see above) was added over a period of 1-2 minutes and the resulting mixture was stirred for 5 minutes. A wetting agent (Lumitin ISC (BASF)) was added and, optionally, water was also added to reach the desired viscosity. The adhesives were adjusted to 300-800 Cps at 60 RPM Brookfield number 3 spindle 60 RPM. The different adhesives were then applied to labels according to procedures commonly known in the art and the labels were tested as set forth elsewhere herein.

Adhesives having different relative concentrations of an acrylate polymer or copolymer, a tackifier resin and second polymer selected from the group consisting of ethylene-acrylic acid copolymer, oxidized polyethylene, oxidized ethylene-vinyl acetate copolymer, maleated polyolefin and combinations thereof, were produced by using appropriate amounts of starting materials. For example, the adhesive described in Example 2, was produced by combining 72 parts (by weight) of the acrylate copolymer commercially available from BASF Corporation, Charlotte, N.C., USA, under the trademark Acronal® V215 with 28-14 parts (by weight) of rosin ester resin commercially available from Eastman Chemical Company, Kingsport, Tenn., USA, under the trademark Tacolyn™ 3509 and zero to 14 parts of ethylene-acrylic acid copolymer commercially available from Honeywell International Inc. under the trademark A-C® 5120 to result in a total of 100 parts. Amounts of these different components in the final adhesive can also be determined using commonly known techniques that are standard in the art.

Example 2—Testing of Pressure-Sensitive Adhesive Labels

Figure 2:
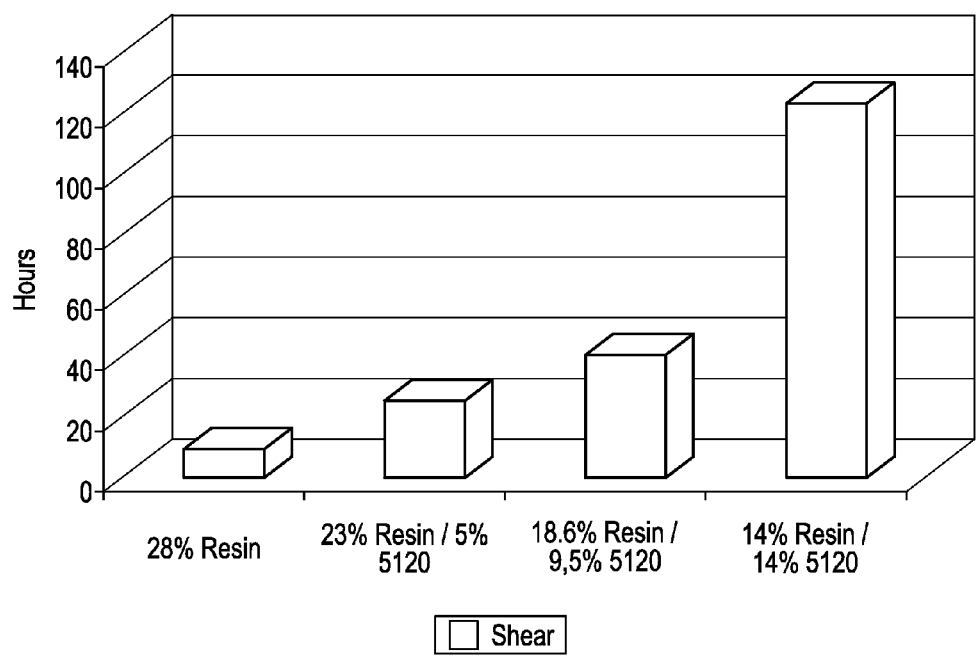
FIG. 2 shows the shear adhesion properties of the same pressure-sensitive adhesives the properties of which are shown in FIG. 1 above, except that the scale of the histogram was enlarged.

Pressure-sensitive adhesive tapes containing different adhesives, described in Example 1 above, were tested for resistance to shear on stainless steel (Shear), loop tack to low density polyethylene (Tack Poly) and to stainless steel (Tack SS), and peel adhesion to card board (Peel Card) and to low density polyethylene (Peel Poly). Measurements were performed as described above, except that stainless steel was exchanged for low density polyethylene and card board as the adherent, as indicated in FIG. 1. The adhesives tested contained about 72 weight % (of the total weight of the adhesive) of the acrylate copolymer commercially available from BASF Corporation, Charlotte, N.C., USA, under the trademark Acronal® V215, as well as rosin ester resin commercially available from Eastman Chemical Company, Kingsport, Tenn., USA, under the trademark Tacolyn™ 3509 and ethylene-acrylic acid copolymer commercially available from Honeywell International Inc. under the trademark A-C® 5120 in the indicated weight % (of the total weight of the adhesive) (FIGS. 1 and 2).

Figure 3:
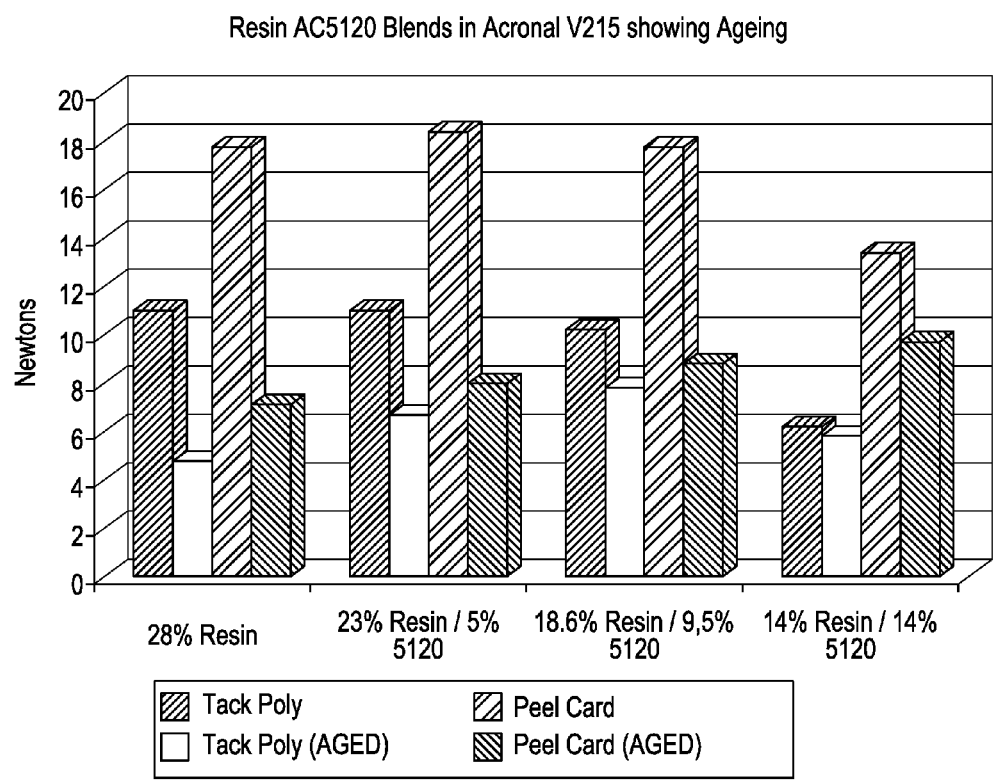
FIG. 3 shows the results of measurements similar to those underlying FIG. 1, except that here the influence of aging on the properties of the adhesives is depicted, as indicated in the figure and further explained in the Examples below.

The pressure-sensitive adhesive tapes were then aged for three days at 50° C. in 100% relative humidity and tested for loop tack to low density polyethylene (Tack Poly) and for peel adhesion to card board (Peel Card) (FIG. 3), as described above.

Figure 4:
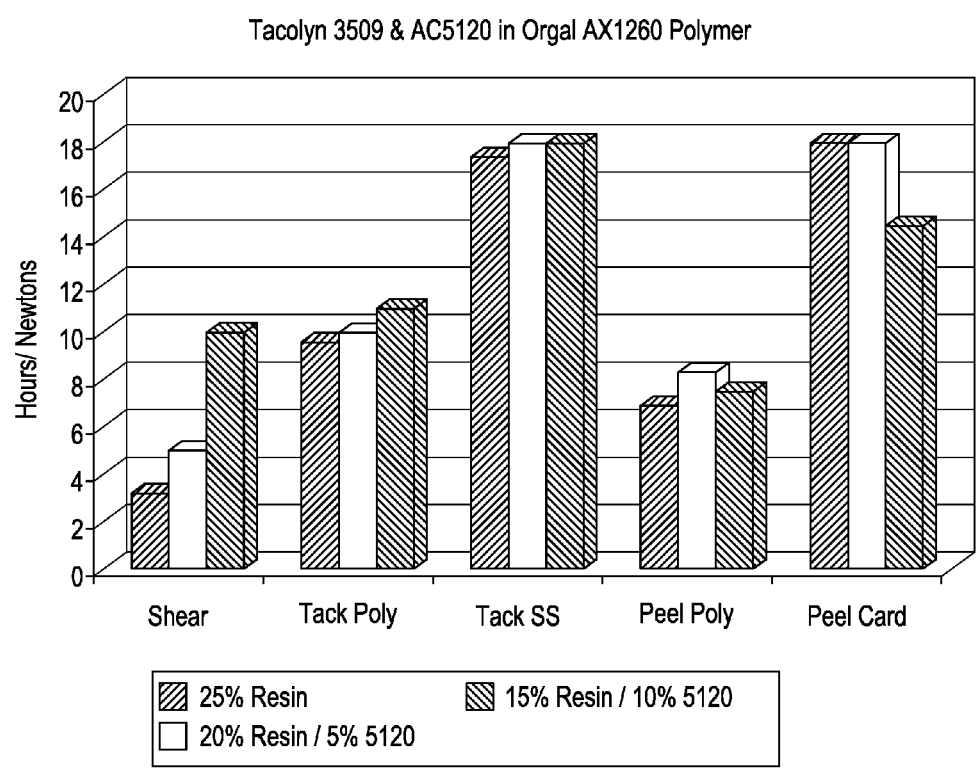
FIG. 4 shows the results of measurements similar to those underlying FIG. 1, except that the adhesives contained about 75 weight % of the acrylate copolymer commercially available from Organic Kimya, Turkey, under the name Orgal AX1260 instead of the Acronal® V215 product available from BASF.
Figure 5:
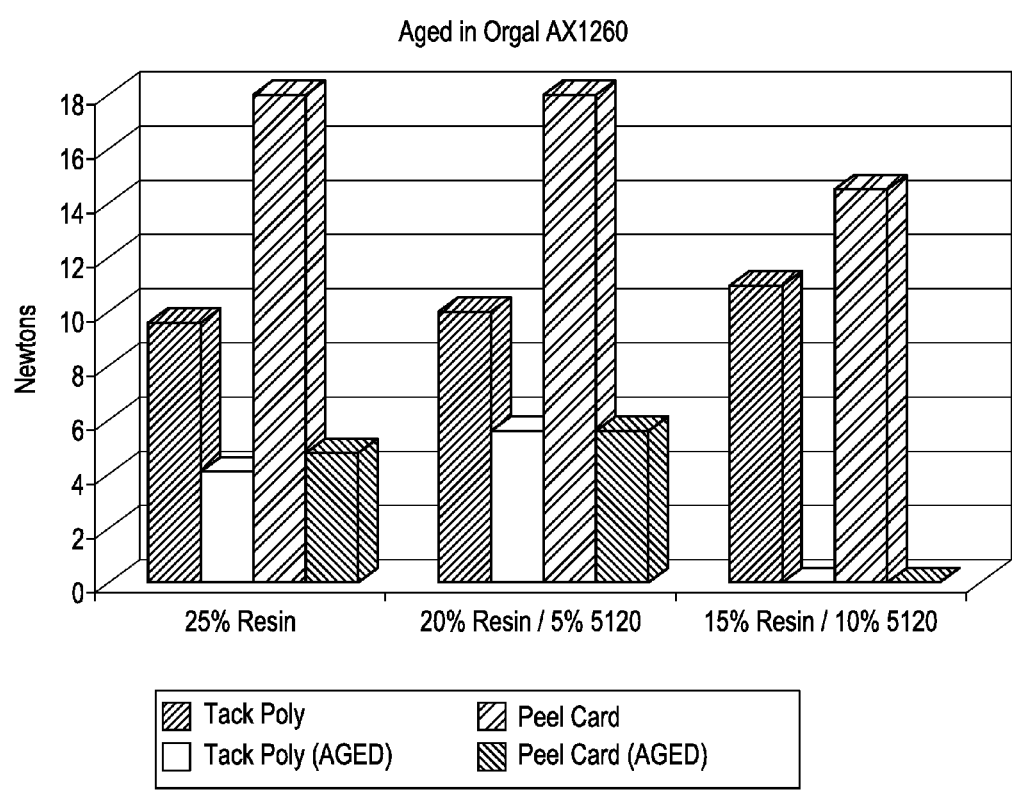
FIG. 5 shows the results of measurements similar to those underlying FIG. 4, except that here the influence of aging on the properties of the adhesives is depicted, as indicated in the figure and further explained in the Examples below.

Similar tests were conducted with pressure-sensitive adhesives that contained the acrylate copolymer commercially available from Organic Kimya, Turkey, under the name Orgal AX1260 instead of the Acronal® V215 product (FIGS. 4 and 5). There are no data points with respect to the aged adhesive comprising 10% of the A-C® 5120 wax product (FIG. 5).

Figure 6:
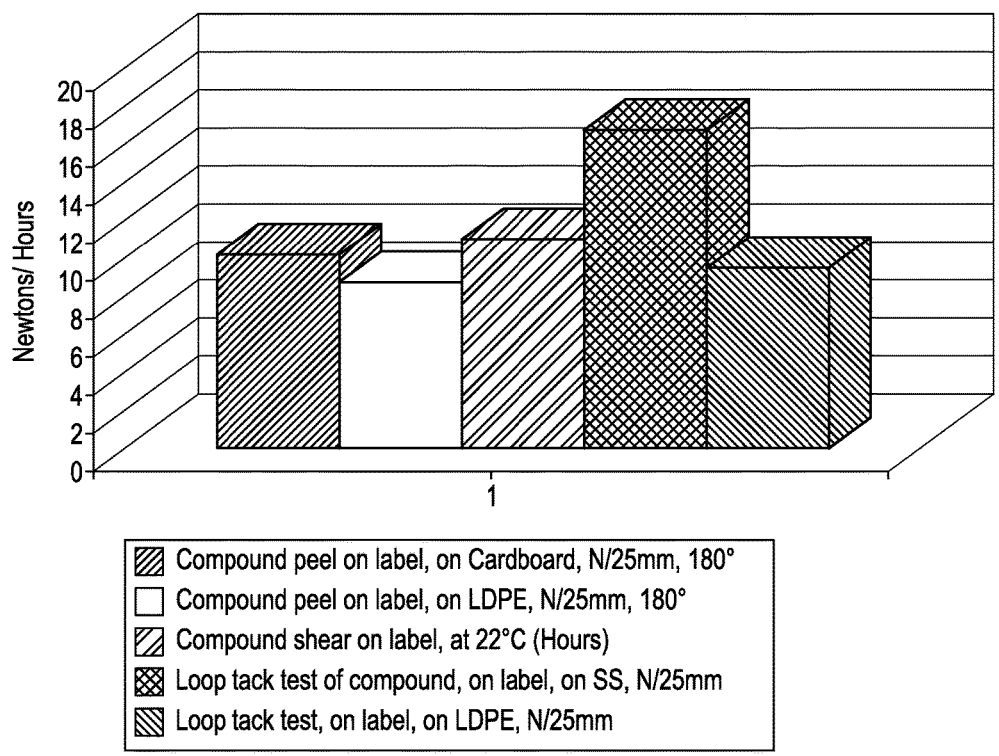
FIG. 6 shows the results of measurements similar to those underlying FIG. 1. The pressure-sensitive adhesive tested contained about 65 weight % (of the total weight of the adhesive) of the acrylate copolymer commercially available from BASF under the trademark Acronal® V215, about 25 weight % (of the total weight of the adhesive) of the rosin resin dispersion commercially available from Arizona Chemical, FL, USA, under the trademark Aquatac™ XR 4343, and about 10 weight % (of the total weight of the adhesive) of a 25:75 mixture of the ethylene-acrylic acid copolymer commercially available from Honeywell International Inc. under the trademark A-C® 5120 and the oxidized polyethylene polymer commercially available from the same source under the trademark A-00 656. SS stands for stainless steel and LDPE stands for low density polyethylene.

Similar tests were also conducted with pressure-sensitive adhesives that contained about 65 weight % (of the total weight of the adhesive) of the acrylate copolymer commercially available from BASF Corporation, Charlotte, N.C., USA, under the trademark Acronal® V215, about 25 weight % (of the total weight of the adhesive) of the rosin dispersion commercially available from Arizona Chemical, FL, USA, under the trademark Aquatac™ XR 4343, and about 10 weight % (of the total weight of the adhesive) of a 25:75 mixture of the ethylene-acrylic acid copolymer commercially available from Honeywell International Inc. under the trademark A-C® 5120 and the oxidized polyethylene polymer commercially available from Honeywell International Inc. under the trademark A-C® 656 (FIG. 6).

The above measurements show that the adhesives containing the A-C® 5120 wax product had significantly better shear resistance than the adhesives without it. As can be seen in FIGS. 1 and 2, for example, the adhesive comprising 14% of the A-C® 5120 wax product had a shear resistance of almost 120 hours, whereas the adhesive without it had a shear resistance of only about 8 hours. This about 15 times increase of the shear resistance was unexpected. After aging, the adhesives containing the A-C® 5120 wax product appeared to perform significantly better than the adhesives without it. The above measurements show that with respect to tack and peel adhesion properties under non-aged conditions, the adhesives containing the A-C® 5120 wax product were overall similar to the adhesives without it.

Example 3—Other Pressure-Sensitive Adhesives

Pressure-sensitive adhesives are also prepared that comprise the polymer products commercially available from Honeywell International Inc. under the trademarks A-C® 645P and A-C® 655. These pressure-sensitive adhesives are manufactured in accordance with the information provided in Example 1 and are subjected to tests as those described above.

Example 4—Pressure-Sensitive Adhesives without Rosin

Pressure-sensitive adhesives are also prepared that contain no rosin tackifier resin. These adhesives contain only the first polymer that is acrylate polymer or copolymer comprising polymerized monomers selected from the group consisting of acrylic acid, butyl acrylate, 2-ethylhexyl acrylate, methyl methacrylate, octyl acrylate, styrene, vinyl acetate and combinations thereof; and the second polymer selected from the group consisting of ethylene-acrylic acid copolymer, oxidized polyethylene, oxidized ethylene-vinyl acetate copolymer, maleated polyolefin and combinations thereof. These pressure-sensitive adhesives are manufactured in accordance with the information provided in Example 1 and are subjected to tests as those described in paragraphs above.

What is claimed is:

1. A pressure-sensitive adhesion composition comprising: a) about 59 weight % to about 98.5 weight %, based on the total weight of the adhesive of a first polymer that comprises a majority component of either 2-ethylhexylacrylate or butyl acrylate copolymerized with a minority component of either methyl methacrylate, vinyl acetate, or styrene; b) about 1 weight % to about 17.5 weight % based on the total weight of the adhesive of a second polymer consisting of an ethylene-acrylic acid copolymer having a number average molecular weight between 1500 and 3000 in combination with an oxidized polyethylene having a number average molecular weight between 800 and 6000; and c) about 0.5 weight % to about 40 weight % based on the total weight of the adhesive of a tackifier resin having a number average molecular weight between about 270 and about 1400, selected from the group consisting of rosin ester resin, rosin acid resin, synthetic hydrocarbon resin, synthetic terpenic resin and combinations of two or more thereof;
wherein the composition is water-based and adapted for pressure-sensitive adhesion to substrates.

2. The composition of claim 1, wherein the ethylene-acrylic acid copolymer has an acid number of between about 40 mg KOH/g and about 200 mg KOH/g determined according to method ASTM D-1386, a hardness at 25° C. of less than about 20 dmm determined according to method ASTM D-5, and a viscosity at 140° C. of between about 200 cps and about 800 cps determined with a Brookfield rotational viscometer; and
wherein the oxidized polyethylene has an acid number of between about 10 mg KOH/g and about 21 mg KOH/g determined according to method ASTM D-1386, a hardness at 25° C. of between about 0.5 dmm and about 13 dmm determined according to method ASTM D-5, and a viscosity at 140° C. of between about 100 cps and about 500 cps determined with a Brookfield rotational viscometer.

3. The composition of claim 1, wherein the second polymer b) is present in an amount of about 1% to about 4% by weight based on the total weight of the adhesive.

4. The composition of claim 1, wherein the tackifier resin c) is present in an amount of up to about 10% by weight based on the total weight of the adhesive while being present at least about 0.5%.

5. The composition of claim 1, wherein second polymer b) is present at 10% by weight, and wherein a weight ratio of the ethylene-acrylic acid copolymer to the oxidized polyethylene is 25:75.

6. A process of forming a pressure-sensitive adhesive article of manufacture comprising a step of applying the pressure-sensitive adhesion composition of one of claim 1 or 2 to a support member.

7. An article of manufacture comprising: a support member and a pressure-sensitive adhesion layer attached thereto comprising a) about 59 weight % to about 98.5 weight %, based on the total weight of the adhesive of a first polymer that comprises a majority component of either 2-ethylhexylacrylate or butyl acrylate copolymerized with a minority component of either methyl methacrylate, vinyl acetate, or styrene, wherein the main component is present in the copolymer in relative proportion greater than the minor component; b) about 1 weight % to about 17.5 weight % based on the total weight of the adhesive of a second polymer consisting of an ethylene-acrylic acid copolymer having a number average molecular weight between 1500 and 3000 in combination with an oxidized polyethylene having a number average molecular weight between 800 and 6000; and c) about 0.5 weight % to about 40 weight % based on the total weight of the adhesive of a tackifier resin having a number average molecular weight between about 270 and about 1400, selected from the group consisting of rosin ester resin, rosin acid resin, synthetic hydrocarbon resin, synthetic terpenic resin and combinations of two or more thereof;

wherein the adhesion layer is water-based and adapted for pressure-sensitive adhesion to substrates.

8. The article of manufacture of claim 7, wherein the ethylene-acrylic acid copolymer has an acid number of between about 40 mg KOH/g and about 200 mg KOH/g determined according to method ASTM D-1386, a hardness at 25° C. of less than about 20 dmm determined according to method ASTM D-5, and a viscosity at 140° C. of between about 200 cps and about 800 cps determined with a Brookfield rotational viscometer; and wherein the oxidized polyethylene has an acid number of between about 10 mg KOH/g and about 21 mg KOH/g determined according to method ASTM D-1386, a hardness at 25° C. of between about 0.5 dmm and about 13 dmm determined according to method ASTM D-5, and a viscosity at 140° C. of between about 100 cps and about 500 cps determined with a Brookfield rotational viscometer.

9. The article of manufacture of claim 7, wherein the second polymer b) is present in an amount of about 1% to about 4% by weight based on the total weight of the adhesive.

10. The article of manufacture of claim 7, wherein the tackifier resin c) is present in an amount of up to about 10% by weight based on the total weight of the adhesive while being present at least about 0.5%.

* * * * *